Nov. 24, 1964   T. B. EDWARDS   3,158,219
METADYNE DRIVE AND CONTROL SYSTEM FOR SELF-PROPELLED VEHICLE
Filed Sept. 7, 1962   4 Sheets-Sheet 1

INVENTOR.
THEODORIC B. EDWARDS
BY George F. Western
ATTORNEY

INVENTOR.
THEODORIC B. EDWARDS

Nov. 24, 1964  T. B. EDWARDS  3,158,219
METADYNE DRIVE AND CONTROL SYSTEM FOR SELF-PROPELLED VEHICLE
Filed Sept. 7, 1962  4 Sheets-Sheet 3

INVENTOR.
THEODORIC B. EDWARDS
BY
ATTORNEY

INVENTOR.
THEODORIC B. EDWARDS
BY
ATTORNEY 3,158,219
METADYNE DRIVE AND CONTROL SYSTEM FOR
SELF-PROPELLED VEHICLE
Theodoric B. Edwards, 5311 Neptune Drive,
Alexandria, Va.
Filed Sept. 7, 1962, Ser. No. 222,246
11 Claims. (Cl. 180—6.5)
(Granted under Title 35, U.S. Code (1952), sec. 266)

The invention described herein may be manufactured and used by or for the Government for governmental purposes without the payment to me of any royalty thereon.

The present invention relates to the field of electric drive and control systems for track or wheel self-propelled vehicles.

The propulsion systems for some track or wheel vehicles comprise one or more electric generators driven by an internal combustion engine which supply current to a group of electric motors on each side of the vehicle. Each group of motors drives the track or wheels on its respective side of the vehicle. Under certain operating conditions (e.g. braking, turning, or running downhill) the motors on one or both sides of a vehicle may, because of the back E.M.F. developed, operate as generators. This alternative action of the motors may be useful as in dynamic braking of the vehicle. The construction and operation of metadyne generators which deliver two or more separate currents from their several sets of brushes are likewise well known. A good exposition of the subject is contained in Pestarini, Metadyne Statics (1952). Heretofore, however, no electric drive and steering system has been devised for a self-propelled vehicle utilizing a metadyne generator to drive two groups of motors one on the left hand and one on the right hand side of the vehicle.

Accordingly, it is an object of this invention to provide an improved electric drive and control system of great flexibility which is reliable, easy to operate, and has a very rapid rate of response for self-propelled track or wheel vehicles such as tractors and military tanks.

Another object of the invention is to provide an improved electric drive and steering system for self-propelled vehicles having a metadyne generator, a group of motors driving the track or wheels on each side of the vehicle supplied with current by that generator, and means to secure efficient interaction of the metadyne generator and motors for all conditions of vehicle operation and maneuver.

For a complete understanding of the invention and an appreciation of its other objects and advantages reference should be made to the specification which follows and to the accompanying drawings in which.

Figure 1:
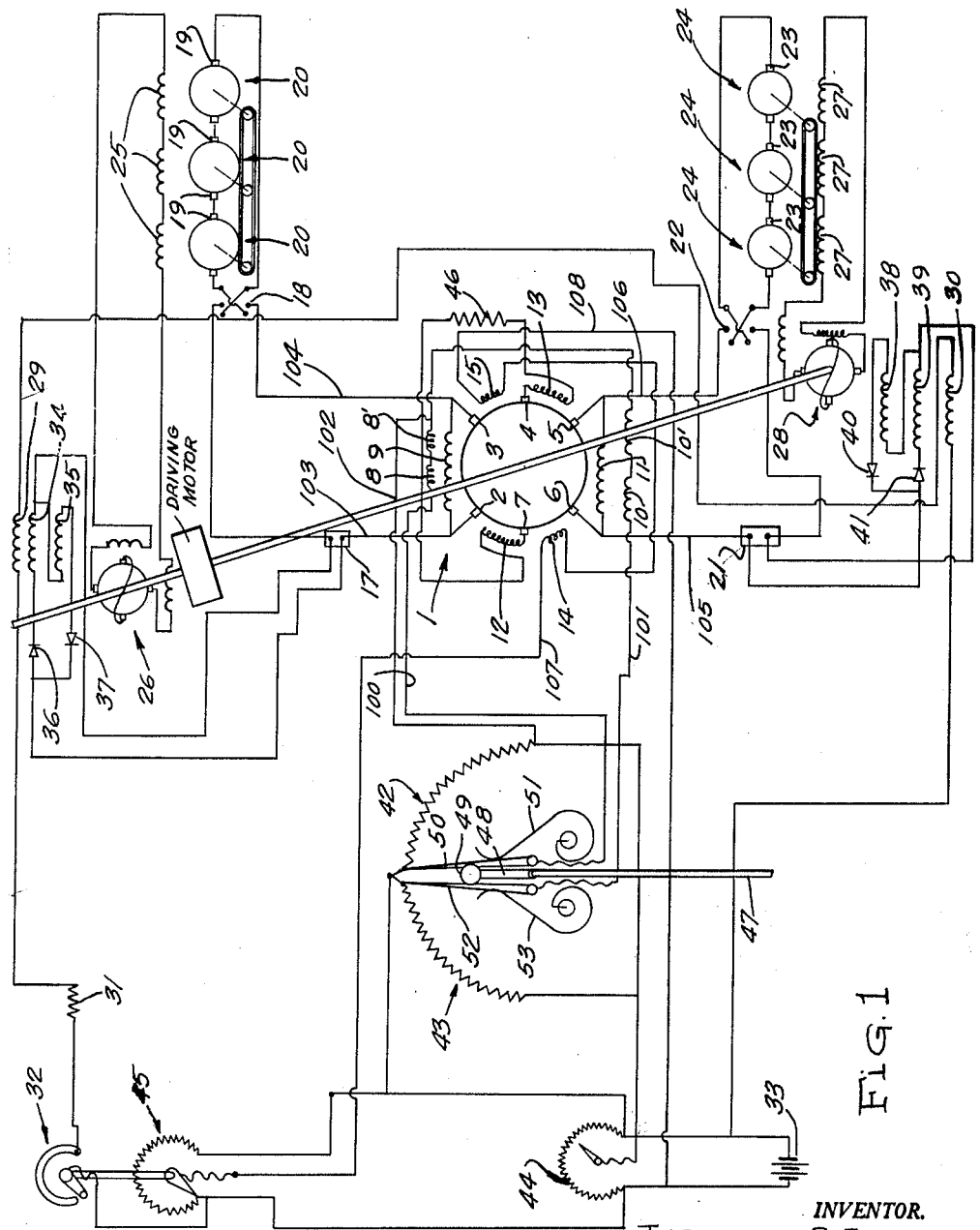
FIG. 1 illustrates the metadyne drive and control system for self-propelled vehicles in its preferred form employing an "H" generator metadyne.

Referring to FIG. 1 of the drawings, the invention in its preferred form comprises an "H" generator metadyne 1 capable of delivering three separate currents through brush pairs 2-3, 5-6, and 4-7. The current delivered by brushes 2 and 3 is responsive to the excitation of speed and steering field windings 8 and 8' and stabilizing winding 9. The current delivered by brushes 5 and 6 is responsive to the excitation of speed and steering field windings 10 and 10' and stabilizing winding 11, and that delivered by brushes 4 and 7 is responsive to field windings 12, 13, 14, and 15. Metadyne 1 is mechanically coupled to and driven by a prime mover (not shown) which may be an internal combustion engine.

Brushes 2 and 3 of metadyne 1 are connected through shunt 17 and reversing switch 18 to the armatures 19 of modified series-wound, electric motors 20 which drive the left track or wheel group not shown. Brushes 5 and 6 are similarly connected through shunt 21 and reversing switch 22 to armatures 23 of the right hand motors 24. Field windings 25 of left hand motors 20 are excited by current supplied by amplidyne exciter 26; field windings 27 of the right group of modified series-wound motors 24 are excited by amplidyne 28. Both amplidyne exciters may be driven by the prime mover.

Field windings 29 and 30 of amplidyne exciters 26 and 28 respectively, are connected to each other and through resistor 31 and normally open braking switch 32 to vehicle battery 33. Field windings 34 and 35 of amplidyne 26 are connected to each other and to unidirectional current flow devices such as diodes 36 and 37 in the manner shown. Field windings 34 and 35 are alternatively energized by current picked off the armature circuit of the left hand motor group by shunt 17, diodes 36 and 37 being so connected that diode 36 permits current to pass through it only when moving from left to right and diode 37 permits the passage of current when moving from right to left. From the foregoing it can be seen that the output of amplidyne 26 and hence the excitation of field windings 25 of left hand motors 20 will at all times be proportional to the current flowing through armatures 19 of those motors. However, because of the arrangement of windings 34 and 35 and diodes 36 and 37, the current in the left hand motor windings 25 will not be reversed even though the armature current in those motors is reversed in direction. Field windings 38 and 39 of amplidyne 28, diodes 40 and 41 and shunt 21 are connected in a similar fashion so that the current supplied by amplifying metadyne 28 to field windings 27 of right hand motors 24 is always proportional to the current flowing armatures 23 of those motors but is constant in direction despite a change in direction of the armature current. The constant direction of the current in the motor fields leads to more efficient operation when the motors function as generators.

Returning to the "H" generator metadyne 1, its various field windings are connected in the manner hereinafter described. Stabilizing field winding 9 is connected in shunt across brushes 2 and 3; stabilizing field winding 11 is connected across brushes 5 and 6. Speed and steering field windings 8 and 8' are connected to vehicle battery 33 through left hand steering potentiometer 42 and speed control potentiometer 44. Speed and steering field windings 10 and 10' are connected to battery 33 through right hand steering potentiometer 43 and speed control potentiometer 44. The current flowing through braking control field windings 14 and 15 from vehicle battery 33 is controlled by braking potentiometer 45. The movable arm of braking potentiometer 45 is mechanically coupled to the movable arm of brake switch 32. The resistor 31 shown is of the fixed type, however, resistor 31 could be elimniated and switch 32 be replaced by a resistor of the variable type. The operator actuates braking potentiometer 45 and braking switch 32 by stepping on the brake pedal of the vehicle.

The speed control potentiometer 44, the left steering potentiometer 42 and the right steering potentiometer 43 are manually controlled by the operator. The setting of the two steering potentiometers is changed by steering shaft 47 which causes crank 48 to rotate from the normal position shown in the drawing either clockwise or counterclockwise through an angle of up to 90°. When the vehicle is to be turned to the left, crank 48 rotates clockwise, wheel 49 at the end of crank bears against and rotates left steering potentiometer arm 50. When the vehicle is to be turned to the right, crank 48 rotates counterclockwise, wheel 49 bears against and rotates right steering potentiometer arm 52. Springs 51 and 53 holds steering potentiometer arms 50 and 52 respectively in the positions shown in the drawing when the steering shaft and crank are in their normal positions. The turning of steering shaft 47 may be accomplished by any conventional means, for example it may be coupled to a steering wheel. Steering shaft 47 might also be controlled by the novel mechanical steering means illustrated in my application Serial No. 142,746, filed October 3, 1961.

The function of the various components of the electric drive and steering system shown in FIG. 1 during various conditions of operation will now be explained. A constant speed for a prime mover will be assumed.

When the vehicle is moving straight ahead, motors 20 and 24 of both the left and right hand groups are acting as motors. Current flows from brush 2 of "H" generator metadyne 1 through shunt 17, and armatures 19 of motors 20 back through brush 3 to the armature of the "H" generator metadyne. Field winding 9 shunted across brushes 2 and 3 of "H" generator metadyne 1 stabilizes this current. The magnitude of this current is controlled by speed and steering coils 8 and 8'. Inasmuch as left steering potentiometer arm 50 is in its normal or neutral position, the current flowing to windings 8 and 8' from vehicle battery 33 is determined entirely by speed control potentiometer 44. Field windings 25 of the left hand motors 20 are energized by current from amplidyne exciter 26. Field winding 34 of amplifying metadyne 26 is energized by current picked off the left hand motor armature circuit by shunt 17, diode 36 permitting passage of current to winding 34 while diode 37 prevents passage of current through field winding 35. It may be noted that the motors are in effect pseudo-series motors since the current in their field windings is proportional to the current in their armatures. When the vehicle is moving straight ahead, the current supplied by brushes 5 and 6 to right hand motors 24 is exactly equal to that supplied to the left hand motors by brushes 2 and 3 of the "H" generator metadyne. The field windings of the right hand motors are likewise supplied by amplifying metadyne 28 with current equal to that supplied the field windings 25 of the left hand motors.

To make a return to the left the operator turns the steering wheel which causes left steering potentiometer arm 50 to rotate in a clockwise direction. This introduces resistance into the vhicle battery 33 and speed and steering field windings 8, 8' circuit reducing the current through windings 8 and 8'. The voltage across brushes 2 and 3 of metadyne 1 is reduced below the counter E.M.F. induced in armatures 19 of left hand motors 20; current in the armature circuit is reversed and flows into brush 2 and out of brush 3 of metadyne 1 tending to drive the metadyne as a motor. The reversal of current in the armature circuit does not, however, result in a reversal of the current supplied to field windings 25 of left hand motors 20. The current picked off the armature circuit by shunt 17 because it is reversed in direction is no longer able to flow through diode 36 to energize coil 34. Instead it is permitted to flow through alternative field winding 35 of amplidyne 26 by diode 37. Inasmuch as field winding 35 is wound in the direction opposite field winding 34, the field polarity remains the same although the direction of the current supplied by shunt 17 has been reversed.

During the turn to the left, the right hand motors 24 continue to act as motors. In fact the generator action of motors 20 furnishes additional current to help drive them as motors. Thus the driving action of the right hand motors and drag of the left hand motors combine to make the vehicle turn to the left.

If the operator desires to turn the vehicle to the right, he turns the steering wheel in the opposite direction causing right hand potentiometer arm 52 to rotate in a counterclockwise direction from the neutral position shown in FIG. 1. The interaction of the "H" generator metadyne and the left and right hand motors is similar to that described for a turn to the left except that right hand motors function as generators while the left hand motors continue to function as motors.

When the operator desired to slow the vehicle down or bring it to a stop, he will normally change the setting of the speed control potentiometer at the same time or before he applies the brakes in order to reduce the current supplied coils 8 and 8' and 10 and 10'. Both the left and right hand group of motors will tend to act as generators and will supply current flowing from brush 3 to brush 2 and from brush 6 to brush 5 to the armature of the "H" generator metadyne 1. This reversal of current in the armature circuits of the left hand motors and right hand motors will itself have a braking effect. As the brakes are applied the rotatable arm of braking potentiometer 45 rotates in a clockwise direction from the position shown in FIG. 1. As the braking potentiometer arm rotates the resistance of the circuit decreases and an increasing amount of current will be supplied from vehicle battery 33 to braking control field windings 14 and 15 of "H" generator metadyne 1. This causes a voltage to appear between brushes 7 and 4 and current to flow through braking resistor 46. This current is stabilized by series field windings 12 and 13 of metadyne 1. At the same time as the braking potentiometer 45 is actuated by the brake pedal, braking switch 32 closes completing a circuit from vehicle battery 33 through resistor 31 and braking field windings 29 and 30 of amplidynes 26 and 28. The resulting current supplied by amplidynes 26 and 28 to field windings 25 and 27 of the left and right hand motors stabilizes the generating action of these motors.

It should be noted that in descending long grades the retarding effect of the prime mover is utilized to the maximum extent possible as both left and right hand motor groups supply current through brushes 3 and 2 and 6 and 5 to the "H" generator metadyne 1 which acts as a motor driving the prime mover. If the load exceeds the retarding power of the engine, power is absorbed by resistor 46 under control of stator windings 12 and 13. If a further reduction in speed is required, braking potentiometer 45 is actuated which energizes "H" generator metadyne braking field windings 14 and 15 putting more current through resistor 46. At the same time braking potentiometer 45 is actuated, switch 32 is closed energizing field windings 29 and 30 of the amplidyne exciters thus improving the generator action of the left and right hand groups of driving motors.

If the operator desires to drive his vehicle in a reverse direction, he may do so by throwing reversing switches 18 and 22 which reverses the currents in the armature circuits of the left hand and right hand groups of motors. These reversing switches may also be used singly if the operator desires to turn the vehicle by driving the left hand and right hand groups of motors in opposite direction.

Figure 2:
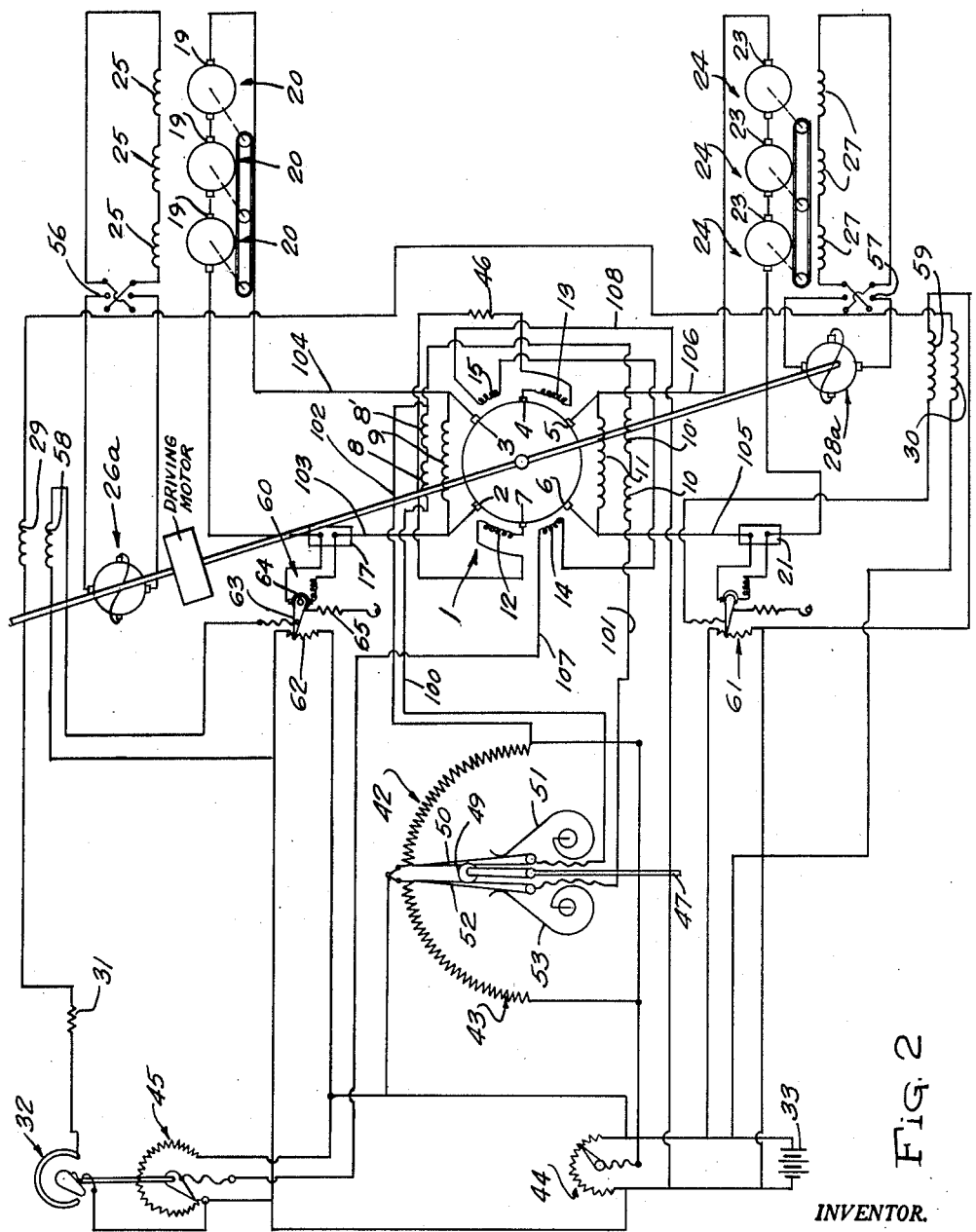
FIG. 2 is a modified form of the metadyne drive and control system also utilizing an "H" generator metadyne.

Referring to FIG. 2 of the drawings, the electric drive and steering control system illustrated therein is very similar to that illustrated in FIG. 1. It also employs an "H" generator metadyne 1 in conjunction with a left and a right group of modified series wound motors. The differences between the systems of FIGS. 1 and 2 will be pointed out. In FIG. 2, reversing switches 56 and 57 which reverse the direction of motors 20 and 24 of the left hand and right hand motor groups respectively are placed in the field circuits of those motors rather than in the armature circuits as in FIG. 1. The principle difference between the two systems relates to the means by which the field windings of amplidyne exciters 26a and 28a are supplied with a constant direction current proportional to the current in the armature circuits of their related groups of motors. Field winding 58 of amplidyne 26a is energized by current supplied from vehicle battery 33. The amount of current supplied is controlled by current proportionalizing means 60. Similarly, field winding 59 of amplidyne 28a is supplied with current from vehicle battery 33 controlled by current proportionalizing means 61. Inasmuch as the construction and function of current proportionalizing means 60 and 61 are identical, only one of them will be described in detail. Current proportionalizer 60 comprises essentially a potentiometer 62 having a slider 63 whose position is determined by the relative action of a small series wound motor 64 and a spring 65. Series wound motor 64 is supplied with current by shunt 17 proportional to the current in the armature circuit of the left hand motors. Inasmuch as the motor 64 is series wound its direction will not change despite changes in direction in the armature current of the left hand motor groups. The mechanical output of the motor is proportional to the current in that armature circuit. The position of potentiometer slider 63 is determined by the balance of motor 64's torque and the tension of spring 65. Thus it can be seen that the current supplied to field winding 58 of amplidyne 26a is practically proportional to the current flowing through motor armatures 19 and the output of amplidyne 26a supplied to motor field windings 25 is in its turn proportional to the current flowing through motor armatures 19. However, the direction of current in these field windings does not change with changes in the direction of the armature current. The small series wound motors should be highly saturated. The motors 20 and 24 of each group act in some ways like series motors except that excessive field copper loss is avoided above field saturation by inherent limitation of current delivered by amplifying metadyne 26a. This is true also of the motors in the system illustrated in FIG. 1 and as in the system of FIG. 1 the propulsion motors of FIG. 2 can act as either generators or motors.

Except for the differences noted, the construction and operation of the system of FIG. 2 is identical with that of FIG. 1. The same reference numerals have been used to indicate identicality of components.

Figure 3:
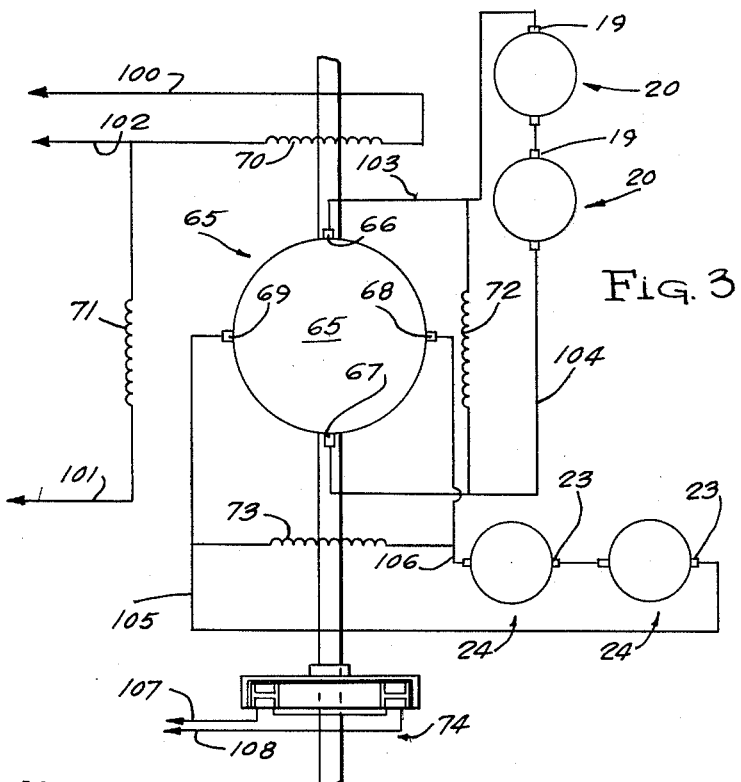
FIG. 3 is a second modified form of the metadyne drive and control system employing a "D" generator metadyne and an eddy current brake.
Figure 4:
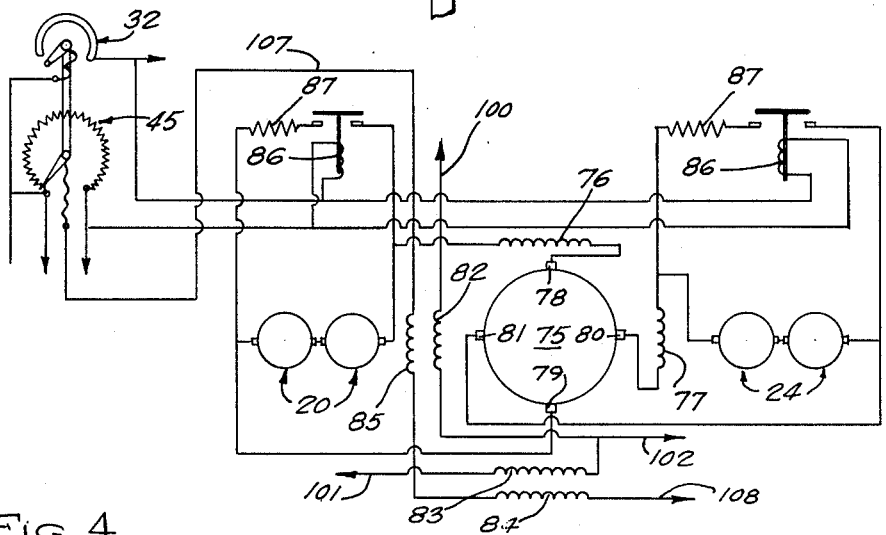
FIG. 4 is another modified form of the metadyne drive and control system illustrating the use of an "A" generator metadyne.

The two modifications of the electric drive and steering systems shown in FIG. 3 and 4 are not illustrated in their entirety. The means for exciting the fields of the left and right hand groups of motors in these two modifications are not included in the drawings. Amplidyne exciters having field windings excited by current picked off the motor armature circuits by shunts may be used as in the systems of FIGS. 1 and 2. The control means to be used with the system of FIG. 3 may be identical to the control means shown in FIGS. 1 and 2; the control means of FIG. 4 may be similar except for braking control. Conductors in FIGS. 3 and 4 which connect the illustrated components of the systems to the control means are numbered with the same reference numerals as the corresponding conductors of FIGS. 1 and 2.

Referring now to FIG. 3, "D" generator metadyne 65 has brushes 66 and 67 connected to the armatures 19 of left motors 20 and brushes 68 and 69 connected to armatures 23 of right motors 24. Speed and steering field winding 70 corresponds to windings 8 and 8' of the "H" generator metadyne of FIG. 1. Speed and steering field winding 71 of the "D" generator metadyne corresponds to field windings 10 and 10' of the "H" generator metadyne. Windings 72 and 73 are shunt stabilizing windings. The current supplied windings 70 and 71 by the vehicle battery are under the control of a speed control potentiometer and left and right hand steering potentiometer identical to those shown in FIG. 1. "D" generator metadyne 65 is mechanically coupled to a prime mover not shown and to eddy current brake 74 of conventional design. The eddy current brake is energized through conductors 107 and 108. The brake energizing current supplied by the vehicle battery is controlled by a braking potentiometer and circuits identical to FIG. 1.

When a vehicle equipped with the system shown in FIG. 3 is proceeding straight ahead under its own power, i.e., with both banks motoring speed and steering field windings 70 and 71 of the "D" generator metadyne are equally energized and equal currents are delivered to left motors 20 and right motors 24. When the operator desires to turn the vehicle to the left, he reduces the current supplied field winding 70 of the "D" generator metadyne which in turn reduces the voltage across brushes 66 and 67. The counter E.M.F. developed in the left motors 20 causes the current in the armature circuit to be reversed and to drive the metadyne; the current supplied the right hand motors 24 is augmented correspondingly and the vehicle executes a turn to the left.

If the operator desires to bring the vehicle to a quick stop, he normally changes the setting of the speed control potentiometer so that minimum current is delivered to windings 70 and 71. Both groups of motors are then delivering current to the metadyne which is operating as a motor against prime mover friction. The brake is simultaneously applied by changing the setting of the braking potentiometer and supplying current through conductors 107 and 108 to eddy current brake 74. The current supplied the eddy current brake 74 should be larger than the current used in energizing windings 14 and 15 of the "H" generator metadyne system of FIG. 1.

Referring to FIG. 4, the system illustrated is generally similar to that shown in FIG. 3 except that a modified "A" generator metadyne having series stabilizing windings 76 and 77 is used. Furthermore, braking resistors 87 are used in lieu of an eddy current brake. It is necessary to disconnect these braking resistors during motoring operations.

Metadyne 75 is connected to left motors 20 through brushes 78 and 79 and to right motors 24 through brushes 80 and 81. Speed control and steering is effected by regulating, through control means similar to those of FIG. 1, the current supplied speed and steering field windings 82 and 83 of metadyne 75.

For normal straight driving equal currents are supplied windings 82 and 83; motors 20 and 24 are thus also supplied with equal current flowing out of brush 78 and brush 80, respectively. For turning the vehicle to the left, the current supplied winding 82 is reduced by the left hand speed control potentiometer. The left motors 20 then act as generators and through metadyne 75 supply additional curent to right motor 24. Through the combined braking action of the left motors and driving action of the right motors the vehicle is made to turn to the left. When the operator applies the brakes, both left and right motors act as generators motoring metadyne 75 against the friction of the prime mover. Braking control field windings 84 and 85 of metadyne 75 are also energized under the control of braking potentiometer 45. Their function is similar to that described for windings 14 and 15 of the "H" generator metadyne of FIG. 1. The same movement of the braking pedal closes switch 32 actuating relays 86 thus introducing braking resistors 87 into the left and right motor circuits. Some of the current generated by the motors is dissipated by these resistors; enough motor current however continues to circulate through the metadyne 75 to provide effective control.

Figure 5:
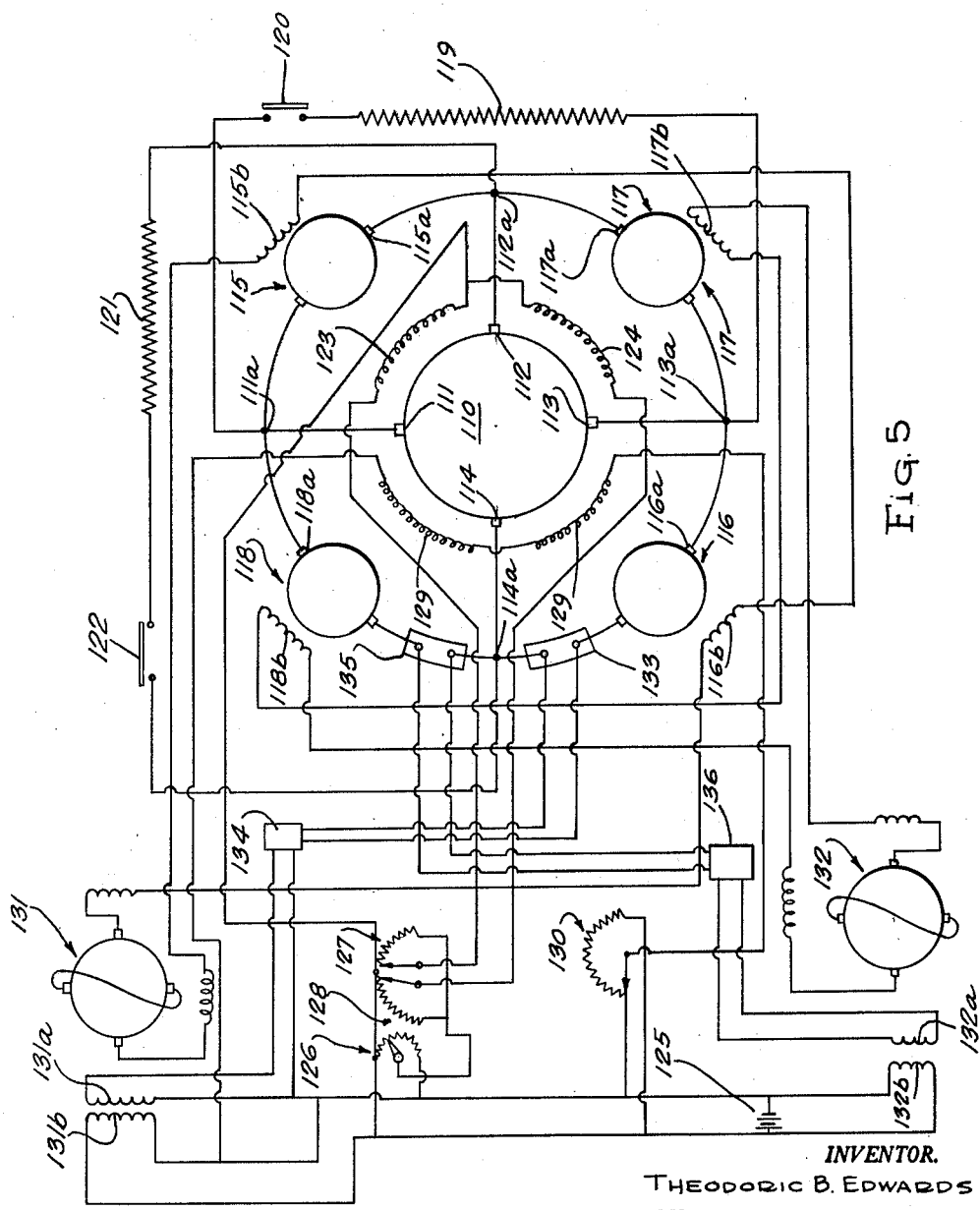
FIG. 5 shows a "cross and clover" metadyne used in another version of the metadyne drive and control system.

FIG. 5 shows a drive and control system employing a modified "cross and clover" metadyne generator. Metadyne generator 110 has brushes 111, 112, 113 and 114 spaced at 90° from each other and each connected at points 111a, 112a, 113a and 114a, respectively, into a ring circuit. Motors 115 and 116 drive the right track or wheel group and motors 117 and 118 drive the left track or wheel group. The armatures 115a, 116a, 117a and 118a of these motors are connected in the ring circuit in accordance with FIG. 5. Braking resistor 119 and normally open braking switch 120 are connected in series across points 111a and 113a; braking resistor 121 and normally open braking switch 122 are connected across points 112a and 114a.

The output of metadyne generator 110 is controlled by right speed and steering field winding 123 and left speed and steering field winding 124. These two field windings are energized by vehicle battery 125, the amount of current in each coil being determined by the setting of speed control potentiometer 126 and the associated right hand 127 or left hand 128 steering potentiometer. Braking control field windings 129 of the metadyne generator are energized by current from battery 125 determined by the setting of brake control potentiometer 130.

The field windings 115b and 116b of right track motors 115 and 116 are energized by amplidyne exciter 131 while windings 117b and 118b of motors 117 and 118 are energized by amplidyne exciter 132. Metadyne 110 and the two amplidyne exciters may be driven by the same prime mover.

The output of exciter 131 is controlled by field windings 131a and 131b and the output of exciter 132 by windings 132a and 132b. Windings 131b and 132b are energized by vehicle battery 125. Winding 131a is energized by current which is proportional to the current flowing through the armatures of right track motors 115 and 116 but constant in direction. The figure shows this current as supplied by shunt 133 and unidirectional current flow device 134. Arrangements similar to those of FIGS. 1 and 2 may be used to supply such a current. Similarly winding 132a is supplied with current proportional to that in the left track motor armatures by shunt 135 and unidirectional current flow device 136.

When the vehicle is being driven straight ahead, current flows in a clockwise direction in the quadrants of the ring circuit containing left motors 117 and 118, and in a counterclockwise direction in the quadrants containing right motors 115 and 116. Thus, for example, the flow in one quadrant is from brush 112 of metadyne 110 to point 112a, through armature 115a to point 111a and thence through brush 111 into the metadyne armature.

When the vehicle is to be turned to the left (by utilizing the left hand steering potentiometer 128 to reduce the excitation of left speed and steering field winding 124) the direction of the current through the armatures of left motors 117 and 118 is reversed. Thus current can flow counterclockwise directly around the ring circuit, i.e., from point 111a to 114a, to 113a to 112a. The left motors act as generators while the right motors continue to drive the right track, receiving current both from metadyne generator 110 and the left motors. Efficiency is improved by the ring circuit inasmuch as current generated by the left motors goes directly to the right motors and does not suffer loss by passing through the metadyne armature.

When the operator applies the brake, switches 120 and 122 are closed. Any convenient method of actuating the switches may be used, for example, a relay system similar to that of FIG. 4. At the same time the operator increases the current supplied braking control windings 129 of metadyne generator 110. All motors function as generators. Current is dissipated by flowing from point 113a through braking resistor 119 to point 111a and from point 112a through braking resistor 121 to point 114a. Enough motor-generated current circulates through the metadyne generator (clockwise in the quadrants of the ring circuit containing the right motors and counterclockwise in the quadrants containing the left motors) to provide effective control.

From the foregoing description it will be clear how other maneuvers are executed. The mode of operation of the two amplidyne exciters 131 and 132 during the various vehicle maneuvers is similar to that of amplidynes 26 and 28 of FIG. 1.

Without reciting further details it will be apparent to a person skilled in the art that many changes and modifications in the design of the system may be made or in parts of its and that the system and parts of it may be used for other purposes besides those enumerated without departing from the principle of the invention. For example a single motor may be used to drive each track or wheel group in the systems illustrated in FIGS. 1–4 rather than a plurality of motors as shown.

I claim:

1. An electric drive and control system for a self-propelled vehicle having a left and a right track or wheel group comprising:
    (a) A metadyne generator adapted to deliver a plurality of currents and having speed and steering field windings controlling said currents;
    (b) Electric motors having armatures connected to the brushes of said metadyne generator and adapted to drive the left track and right track of the vehicle separately;
    (c) Speed control means for supplying a selected current simultaneously to all of said speed and steering field windings;
    (d) Steering control means for supplying a selected current individually to some of said speed and steering field windings; and
    (e) Braking means for absorbing excess current generated during braking of the vehicle.

2. An electric drive and control system as described in claim 1 having:
    (a) Two amplidyne exciters separately exciting the field windings of the left track motors and right track motors; and
    (b) Means for exciting a field winding of each of said amplidyne exciters with a constant direction current proportional to the armature current of the motors with which the amplidyne exciter is associated.

3. An electric drive and control system as described in claim 2 wherein the means for exciting a field winding of each of said amplidyne exciters comprises a shunt connected in the motor armature circuit, a pair of field windings and a pair of unidirectional current flow devices interconnected with each other and with said shunt so that said field windings are alternatively energized dependent on the direction in which current is flowing through the shunt.

4. An electric drive and control system as described in claim 2 wherein the means for exciting a field winding of each of said amplidyne exciters comprises a shunt connected in the motor armature circuit, a series motor connected across said shunt, a current source connected through a slide-type variable resistor to said amplidyne field winding, and a spring biased arm connecting the shaft of said motor to the slide of said variable resistor.

5. An electric drive and control system as described in claim 2 wherein the said amplidyne exciters have braking field windings adapted to be excited simultaneously during braking of the vehicle.

6. An electric drive and control system for a self-propelled vehicle having a left and a right track or wheel group comprising:
    (a) A metadyne generator having a first pair of brushes and associated first speed and steering field windings, and having a second pair of brushes and associated second speed and steering field windings;
    (b) An electric motor adapted to drive the left track having its armature connected to the first pair of brushes of said metadyne generator;

(c) An electric motor adapted to drive the right track having its armature connected to the second pair of brushes of said metadyne generator;

(d) Speed control means for supplying a selected current simultaneously to said first and second speed and steering field windings;

(e) Steering control means for supplying selected currents individually to said first and second speed and steering field windings; and (f) Braking means for absorbing excess current generated during braking of the vehicle.

7. An electric drive and control system for a self-propelled vehicle having a left and a right track or wheel group comprising;

(a) A metadyne generator having a first field winding and associated first speed and steering field windings, and having a second field winding and associated second speed and steering field windings;

(b) A plurality of electric motors adapted to drive the left track having their armatures connected in a series loop circuit with the first field winding of said metadyne generator, and having their field windings connected in a separate series loop circuit with a first amplidyne exciter;

(c) A plurality of electric motors adapted to drive the right track having their armatures connected in a series loop circuit with the second field winding of said metadyne generator, and having their field windings connected in a separate series loop circuit with a second amplidyne exciter;

(d) Means for separately exciting a field winding of each amplidyne exciter with a constant direction current proportional to the armature current of the motors with which the amplidyne is associated;

(e) Speed control means for supplying a selected current, simultaneously to the metadyne generator's first and second speed and steering field windings;

(f) Steering control means for supplying selected currents individually to said first and second speed and steering field windings; and (g) Braking means for absorbing excess current generated during braking of the vehicle.

8. An electric drive and control system as described in claim 7:

(a) Wherein said metadyne generator has a third field winding and braking control field windings associated therewith; and (b) Wherein said braking means include a braking resistor connected across said third field winding, a current source connected to said braking control field windings and means to regulate selectively the current flow between said source and said braking control field windings.

9. An electric drive and control system as described in claim 7 wherein said braking means includes an eddy current brake connected to the armature shaft of said metadyne generator.

10. An electric drive and control system as described in claim 7:

(a) Wherein said metadyne generator includes a braking control field winding associated with each of said first and second field windings; and (b) Wherein said braking means comprises a current source connected to said braking control field windings, means to regulate selectively the current flow between said source and said braking control field windings, a braking resistor connected in series with a switch across the armatures of the right track motors, a braking resistor connected in series with a switch across the armatures of the left track motors and means to actuate said switches.

11. An electric drive and control system for a self-propelled vehicle having a left and a right track or wheel group comprising:

(a) A metadyne generator of the cross and clover type having four brushes spaced at 90° from each other and having left and right speed and steering field windings and braking field windings;

(b) Electric motors connected in series in a ring circuit, each brush of said metadyne generator connected into said ring circuit so as to divide said circuit into quadrants having an equal number of motors with motors adapted to drive the left track in two opposing quadrants and with motors adapted to drive the right track in the other two opposing quadrants;

(c) Two amplidyne exciters separately exciting the field windings of the left track and right track electric motors;

(d) Means for exciting a field winding of each of said amplidyne with a constant direction current proportional to the armature current of the motors with which the amplidyne is associated;

(e) Speed control means for supplying a selected current simultaneously to both left and right speed and steering field windings;

(f) Steering control means for supplying a selected current individually to the left and right speed and steering field windings;

(g) Braking means for absorbing excess current generated during braking of the vehicle including means for supplying a selected current to the braking field windings of said metadyne generator, a braking resistor connected in series with a switch across each pair of opposite brushes of said metadyne generator and means for actuating said switches.

References Cited in the file of this patent

UNITED STATES PATENTS

| 2,393,618 | Edwards et al. | Jan. 29, 1946 |
| 2,498,765 | Pestarini | Feb. 28, 1950 |
| 2,565,293 | Aydelott et al. | Aug. 21, 1951 |
| 2,636,152 | Pestarini | Apr. 21, 1953 |
| 2,962,642 | Brane | Nov. 29, 1960 |

OTHER REFERENCES

"Metadyne Statics," by Pestarini, 1952; published by John Wiley and Sons, Inc., New York, pages 70 and 375.